Aug. 15, 1950   H. FORD ET AL   2,519,036
METHOD OF MOLDING CELLULAR ARTICLES
Filed Aug. 11, 1943   3 Sheets-Sheet 1

H. Ford
R. A. Boyer
INVENTOR.

BY E. C. McRae
R. G. Harris

H. Ford
R. A. Boyer
INVENTOR.

Aug. 15, 1950 H. FORD ET AL 2,519,036
METHOD OF MOLDING CELLULAR ARTICLES
Filed Aug. 11, 1943 3 Sheets-Sheet 3

H. Ford
R. A. Boyer
INVENTOR.

BY E. C. McRae
R. G. Harris

Patented Aug. 15, 1950

2,519,036

UNITED STATES PATENT OFFICE 2,519,036

METHOD OF MOLDING CELLULAR ARTICLES

Henry Ford and Robert A. Boyer, Dearborn, Mich., assignors to Ford Motor Company, Dearborn, Mich., a corporation of Delaware Application August 11, 1943, Serial No. 498,144

5 Claims. (Cl. 154—118)

This invention relates to a method of molding plastics, particularly to the method of molding resin-impregnated materials to light, strong, cellular structures.

Generally, molded plastics have been of the solid, singular-walled type formed of molding compounds or resin-impregnated material. These plastics were at first thought to be able to replace certain rigid materials, but they failed to meet physical requirements. To meet the requirement of strength, plastic moldings were made of greater thicknesses, which disqualified them on their weight requirement. To meet the rigidity requirements, metal inserts or other rigid material such as wire gauge, thin electrically deposited metal sheets, or finely coiled wires were molded in the plastic, but these were not entirely satisfactory.

It is therefore an object of this invention to provide a laminated plastic having greater strength per unit weight than other plastics having the same general composition. Another object of this invention is to provide a lightweight laminated plastic. Still another object of this invention is to provide a method by which the cellular forming means may be easily removed from the laminated structure. Still another object of this invention is to provide a method by which cellular structure may be laminated into complex curves.

An advantage of this invention is that large panels made as prescribed herein are substantially free from warping. Present, conventionally molded plastic sheets, as small as one square foot, inherently warp unless warp-preventing means are incorporated in the body or the plastic sheets molded in thicknesses that are several times normal. This warp-free feature, therefore, permits the use of plastics in wall panels, as a substitute for plywood (having greater strength at less density), in aircraft construction, and wherever light, strong, water- and warp-resistant plastics are adaptable.

With these and other objects in view, this invention consists of the arrangement, construction and combination of the various parts of the improved method and articles, as described in the specification, claimed in the claims and illustrated in the accompanying drawings, in which:

Figure 5:
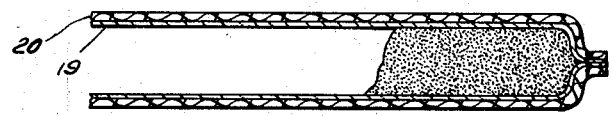
Figure 6:
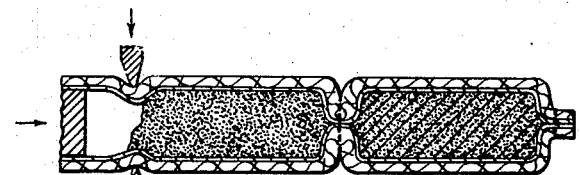
Figure 7:
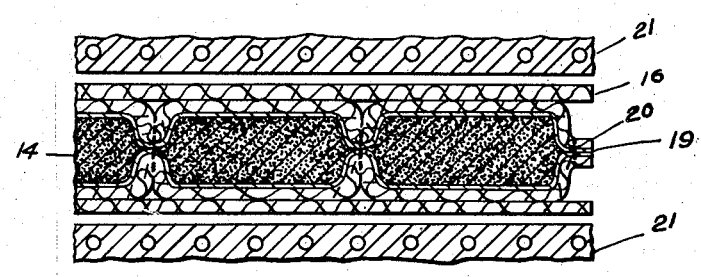
Figure 8:
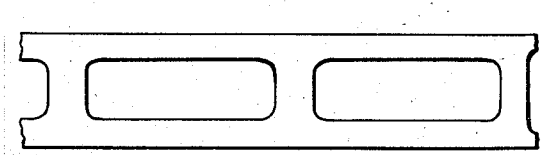

Figs. 5, 6, and 8 illustrate another method by which this said cellular structure may be assembled and the article therefrom. Figure 7 illustrates the molding charge positioned between platens or dies.

Figs. 9, 10, 11 and 12 illustrate some of the possible combinations obtainable from the method disclosed.

Heretofore production of hollow articles in the molding plastic art has employed metallic inserts which were later removed. Another method producing like effects has been the use of rubber inserts such as those used in the tire industry. Generally, these methods have many disadvantages but have been used successfully in limited scope. In the structures as shown herein, however, these methods are not applicable.

In the production of large laminated structures having considerable area, solid inserts or rubber inserts are not practical since the friction, the compacting of the plastic and complexity of design make their removal impossible. This is also true of rubber tubing in which pressure is maintained during the molding cycle. Therefore, because of the foregoing reasons and since removal of solid inserts is impossible from moldings having complex curved designs, such solid inserts may be only used in small, flat structures.

Figure 1:
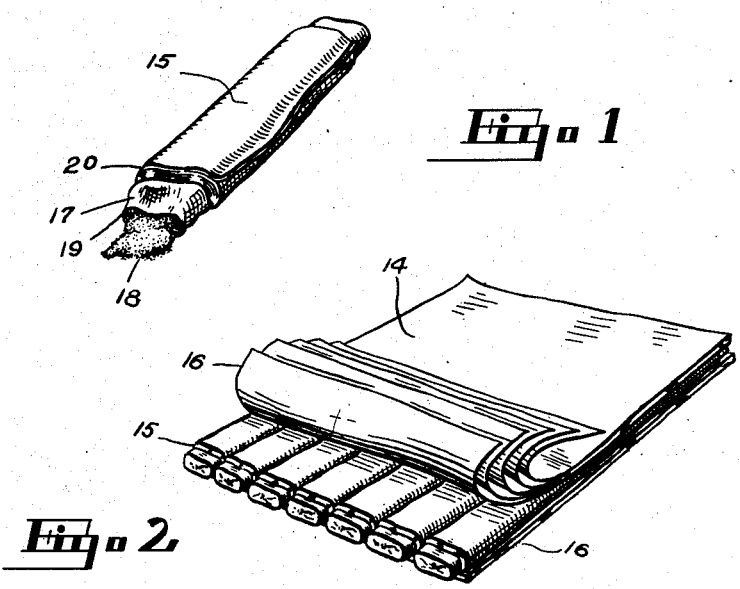
Fig. 1 is a perspective view of an element from which cellular objects are molded.
Figure 2:
Fig. 2 is a perspective view of an assembled lamina prior to the molding operation.
Figure 3:
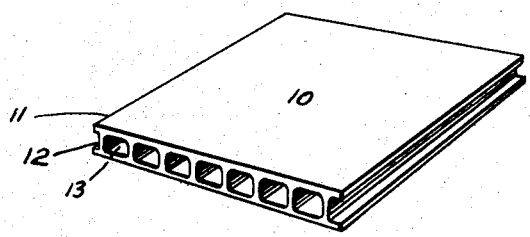
Fig. 3 is a perspective view of finished molded sheet.

Moreover, it is readily seen that if a solid insert were used in the molding of a structure of the type shown in Fig. 3, the webbed, reinforcing portion would not be molded under pressures equivalent to those under which the flat sections are subjected. This is apparent since the compressible material through the web has greater volume than material directly above and below the insert. During the molding cycle the flat section will be, therefore, under full compression, while the web is only partially compressed. This results in a weakened web even though a portion of the resin becoming fluid under heat and pressure flows from the flat section into the web. Also, the flat section may become weakened since there may be an excessive flow of resin from it to the web.

We have been able to overcome the above disadvantages with respect to pressure equalization during the molding cycle and the subsequent removal of the inserts. In the drawings, several of the many possible combinations for increasing the strength of large-area, laminated plastics are shown. The structural strength is increased not only for compressive but also for flexural stress. Such increases are not directly proportional to the amount of stock used as in the case of solid-laminate molding.

Now referring to Fig. 3 in which 10 is a laminated plastic, other examples are shown in Figs. 9, 10, 11 and 12, and these are formed under similar conditions utilizing several variations of structural design, having a flat surface 11 and a web structure 12 forming the hollow chambers 13. The hollow chambers 13 may assume various shapes as shown; they may be positioned in multilayers and at various angles to each other; they may be molded in various curvatures; or they may be irregular in shape such as may be found in an airfoil section, etc.

The laminated plastic 10 is molded from a stack 14 which is composed of rolls 15 juxtapositioned between the flat, resin impregnated sheets 16. The resin-impregnated materials may be one of those taken from the group including natural and artificial fibers, fabrics, paper and other materials known to the art.

Figure 9:
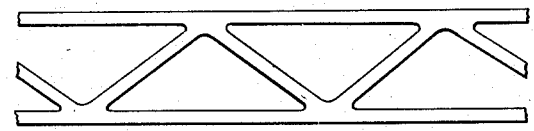
Figure 10:
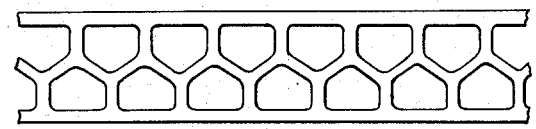

The roll 15 is composed of a mandrel 17 consisting of a core 18 of granular material within a tubing or rolled sheath 19 around which is wound impregnated material 20. These rolls may be formed in various geometric shapes; some of these may or may not be altered during compression due to the equalization of pressures. This is illustrated in Figs. 9 and 10. In the former the triangular tubes retained their original shape, but in the latter the round tubes have been displaced substantially as shown during the molding cycle.

The laminae, composed of stack 14, may be molded under heat and pressure in heated dies or platens depending on the shape desired. Figure 7 illustrates the placing of the stack 14 between heated platens 21, prior to the application of pressure.

Pressure, temperature and time are the variables, dependent on the resin. Therefore, since hollow bodies as shown herein are formed from many resins, these variables are optional to the operators. The use of low-pressure resins is desirable in production of large area panels making available the employment of lower pressure equipment. However, sufficient pressure insuring complete compacting and bonding of the resin and fibers is important. Our molding procedure has been successfully accomplished when pressures of about 50 to 800 pounds per square inch were employed.

The mandrel 17 is formed by filling a sheath 19 with granular, nonpacking materials. These sheathing tubes may be extruded tubes, or tubes formed by rolling sheet stock of cellophane, sized paper and the like. It is important, however, that the sheathing thus made be impermeable since the flow of resin into the granular core will fuse the core, thereby hindering its removal from the finished laminate. The tubes are sealed at the ends by either folding the ends tightly and fastening them to the main portion of the body or by using resilient plugs which are inserted into the ends and held in place during the molding cycle by retaining means attached to the platens.

For the removable core material we choose to use sand but, however, fine metal shot, diatomaceous earths, salts and the like are also suitable. Such materials must be free from packing in order to obtain equal internal and external pressures by lateral or fluid-like displacement of core material to facilitate its removal. These features of nonpacking are especially important in large and bulky curved units which are molded under considerable pressure and from which the core material is ejected by means of an air-blast or vibrating equipment. The removal of sand is very readily accomplished, not requiring special equipment; and in most instances it is removed from that end of the plastic which is trimmed to remove the rough and uneven deposit of resin that exuded during compression.

Figure 4:
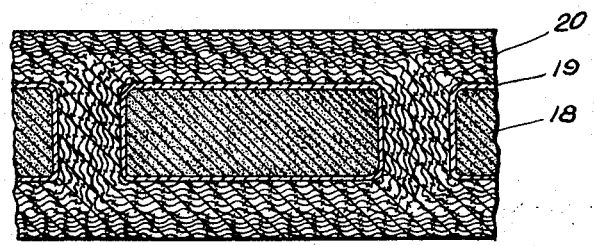
Fig. 4 is a cross-sectional view disclosing the interrelation of the resin impregnated materials, the sheath, and the comminuted material after the molding cycle.

Plastics molded by this method are characterized by their substantially uniform cavities having slight radii rather than sharp corners. This is shown in Fig. 4 in which the compression of fabric and the dispersion of resin is uniform; also the core material and its sheath has been displaced to substantially a rectangle from a circular tube.

An expedient of this invention is the increasing of internal compression pressure by adding to the core mix certain compounds such as ammonium carbonate which under heat will decompose, forming gases, thereby increasing the internal pressure. It has been found that only a small amount of ammonium carbonate is necessary and in many instances from 1 to 5 per cent by weight of the core material has been found suitable.

Another method which may be employed for carrying out this invention is by quilting of the fabric material using sand as a filler, as shown in Figs. 5 through 7 in which the sand is encased between suitable laminated materials. Fig. 5 discloses the initial steps of the operation in which a suitable number of layers of cloth 20 are sewn together, having two sheets of impermeable material therebetween. Sand or other material is injected compacted and enclosed between these layers as shown in Fig. 6. Such quilting may be easily carried out with the equipment that has been developed in the various arts relating to filling and sewing. However, it is not necessary that the quilting be done in any particular shape having perfect symmetry, but rather it is desired that uniform compactness of the material be maintained. The above described sand-filled quilt is placed between either dies or platens which may or may not have complex curvatures. It is important, however, that this type of material be used in dies which are complementary to each other: namely, those that will not impart a draw to the article.

In the foregoing method of preparing laminae for molding, it has been found necessary, at times, to apply a sealing compound along the perforations of the seams to prevent seepage of resin into the core. It is commonly known that like resins are used in plastic moldings that are used in the binding of abrasives, and for this reason resin must be kept removed from the core if normal removal of core is to be expected.

Impermeable materials of the order of paper, cellulosic films, and the like have been found suitable for sheaths for comminuted core materials. These may be seamless, spiral wound, or overlapped, multilayer types. Regardless of the type, mechanical equipment is obtainable in order to facilitate production and to compete with conventional molding process. These sheaths are made in shapes and forms which are, substantially, sections of the finished article. In this manner various contours are produced in the finished molding, yet maintaining the stressed construction therein. As an example, if gradually tapering (in one or more directions) forms are employed, an air foil section may be molded. However, the molding dies must have surfaces generally complementary to the laminae.

Tests on panels molded according to our method show a marked, increased strength over those of straight or solid laminated molding. As a basis of comparison, these tests are taken on a unit-weight-area relationship so that equal amounts of resin, cloth, and the like can be readily compared. Test strips are tested both for flexural strength and for compressive strength. The flexural test consists of placing a test strip on two separated supports while a third support is brought to bear on the plastic in the opposite direction. Pressure is then slowly applied until failure occurs and the pressure accordingly recorded.

Plastics as molded by our method are found to be far superior both in a transversal and longitudinal strength to conventionally molded plastics containing equal amounts of resin, fabric, etc. differing only in volume due to the method of molding. The increase in strength in the longitudinal direction has been in excess of four times the conventional plastic, while the transversal strength has been increased in excess of twice. This variation is to be expected since the panel longitudinally is reinforced by the web forming an I-beam construction.

Under compression tests our plastic cannot be compared with conventionally molded plastics which are extremely flexible unless molded in heavy sections, but on a weight basis, approaches the compression strength of aluminum having a similar construction. However, since the aluminum is extremely difficult to fabricate in the same shape and size as that of our plastic, it was necessary to use a single flat sheet and rivet to it conventional reinforcing members.

In comparison with wood, our plastic under compression has a higher modulus while possessing a much lower density. As an example, hickory has a modulus, representative of the hard woods, of about 9,000 pounds per square inch and a density of about .026 lb./in.$^3$, while our plastic has a modulus of about 15,000 pounds per square inch and a density of about .017 lb./in.$^3$.

Figure 11:
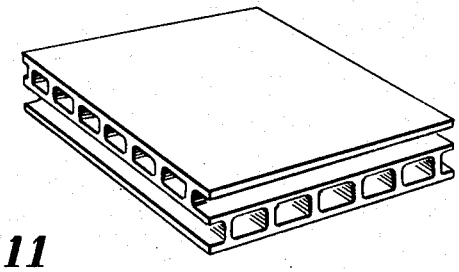
Figure 12:
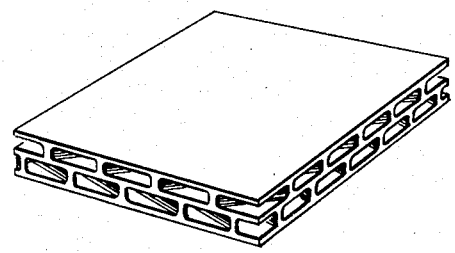

Figures 9–12 illustrate various configurations obtainable utilizing a present invention. Figure 9 illustrates laminated plastic formed from triangular rolls or tubes by inverting each alternate tube. The illustration of Figure 10 is obtained by molding two layers of round tubes, each layer running the same direction but being offset one half the diameter of a tube. The configuration of Figure 11 is formed by placing layers of tubes at right angles to each other; while that of Figure 12 was formed by placing the two layers of tubes at 45° angles to each other. It is readily seen that many combinations may be derived, depending on the ingenuity of the designer and the prerequisites of the finished article.

From the foregoing examples it is readily seen that some changes may be made in the arrangement, construction and combination of the process and article without departing from the spirit of the invention, and it is the intention to cover by the claims such changes as may be reasonably included within the scope thereof.

We claim:

1. In a process for the production of a uniformly pressed cellular sheet material, the steps comprising enclosing a comminuted, nonpackable, flowable material in a flexible container, placing a moldable substance in intimate contact with the filled container, positioning a plurality of these filled and covered containers between sheets of a moldable material to form a molding charge and molding this charge under heat and pressure.

2. The process of claim 1 in which the comminuted material contains sand.

3. In a process for the production of a uniformly pressed cellular sheet material, the steps comprising enclosing a comminuted, nonpackable, flowable material in a flexible, cellulosic container, wrapping this filled container with a film of moldable material, positioning a plurality of these filled and wrapped containers between sheets of a moldable material to form a molding charge and molding this charge under heat and pressure.

4. The process of claim 3 in which the comminuted material contains sand.

5. A process for the production of a uniformly pressed cellular sheet material comprising quilting comminuted, nonpackable, flowable material between sheets of resin-impermeable, flexible cellulosic material, applying a sealing compound to the needle perforations, placing adjacent thereto resin-impregnated sheeting in long, narrow sections, positioning the quilted sections and resin-impregnated flexible cellulosic materials between sheets of additional resin-impregnated material and molding under heat and pressure.

HENRY FORD.
ROBERT A. BOYER.

REFERENCES CITED

The following references are of record in the file of this patent:

UNITED STATES PATENTS

| Number | Name | Date |
|---|---|---|
| Re. 22,301 | Pitman | Apr. 13, 1943 |
| 100,705 | Kleckner | Mar. 8, 1870 |
| 1,343,191 | Allcutt | June 15, 1920 |
| 1,393,541 | Kemp | Oct. 11, 1921 |
| 1,400,078 | Kempton | Dec. 13, 1921 |
| 1,469,220 | Kemp | Oct. 12, 1923 |
| 1,473,842 | Frederick | Nov. 13, 1923 |
| 1,536,700 | Brucker | May 5, 1925 |
| 1,568,411 | Nelson | Jan. 5, 1926 |
| 2,016,273 | Atwood | Oct. 8, 1935 |
| 2,029,048 | Atwood | Jan. 28, 1936 |
| 2,029,049 | Atwood | Jan. 28, 1936 |
| 2,280,771 | Dufour et al. | Apr. 28, 1942 |
| 2,300,760 | Amigo | Nov. 3, 1942 |
| 2,315,634 | McCall | Apr. 6, 1943 |

FOREIGN PATENTS

| Number | Country | Date |
|---|---|---|
| 392,952 | Great Britain | May 22, 1932 |
| 546,089 | Great Britain | June 26, 1942 |